United States Patent

Pinchok, Jr. et al.

Patent Number: 5,653,903
Date of Patent: Aug. 5, 1997

[54] L-SHAPED HEATING ELEMENT WITH RADIUSED END FOR A WINDSHIELD

[75] Inventors: Robert N. Pinchok, Jr., New Kensington; Harry S. Koontz, deceased, late of Pittsburgh, both of Pa., by Cecilia Koontz, executrix

[73] Assignee: PPG Industries, Inc., Pittsburgh, Pa.

[21] Appl. No.: 495,132

[22] Filed: Jun. 27, 1995

[51] Int. Cl.$^6$ .................................................. B60L 1/02
[52] U.S. Cl. .......................... 219/203; 219/522; 219/547
[58] Field of Search ................................. 219/202–203, 219/522, 549, 528–529, 547, 548, 544; 52/171.2; 244/134 D; 338/254

[56] References Cited

U.S. PATENT DOCUMENTS

| | | |
|---|---|---|
| 3,729,616 | 4/1973 | Gruss et al. . |
| 3,752,348 | 8/1973 | Dickason et al. ............... 219/522 |
| 4,017,661 | 4/1977 | Gillery ............................. 428/412 |
| 4,086,594 | 4/1978 | Kropielnicki et al. ........... 219/203 |
| 4,109,133 | 8/1978 | Hanle et al. . |
| 4,196,338 | 4/1980 | Edel ................................ 219/522 |
| 4,321,296 | 3/1982 | Rougier . |
| 4,361,751 | 11/1982 | Criss et al. ...................... 219/203 |
| 4,373,130 | 2/1983 | Krasborn et al. . |
| 4,378,484 | 3/1983 | Kunert . |
| 4,395,622 | 7/1983 | Dran et al. . |
| 4,513,196 | 4/1985 | Bartelsen et al. . |
| 4,613,530 | 9/1986 | Hood et al. ........................ 428/34 |
| 4,645,146 | 2/1987 | Hall ................................ 244/129.3 |
| 4,721,636 | 1/1988 | Hood et al. ...................... 219/522 |
| 4,725,710 | 2/1988 | Ramus et al. ................... 219/203 |
| 4,902,875 | 2/1990 | Koontz ........................... 219/203 |
| 4,910,380 | 3/1990 | Reiss et al. . |
| 4,971,848 | 11/1990 | Ruelle et al. ................... 219/203 |
| 5,070,230 | 12/1991 | Osada et al. ................... 219/203 |
| 5,099,104 | 3/1992 | Holzer et al. .................. 219/203 |
| 5,386,098 | 1/1995 | Knudsen ........................ 219/203 |
| 5,434,384 | 7/1995 | Koontz . |

FOREIGN PATENT DOCUMENTS

| | | |
|---|---|---|
| 2036905 | 8/1991 | Canada . |
| 0625422 | 11/1994 | European Pat. Off. . |
| 0560677 | 9/1993 | France . |
| 1917080 | 10/1970 | Germany . |
| 150979 | 9/1981 | Germany . |
| 2223385 | 4/1990 | United Kingdom . |

OTHER PUBLICATIONS

Tsunemoto, H. et al., "Study of Melting Phenomenon of Frost and Ice on the Windshield", *JSAE Review* 15 (1994) 53–58.

*Primary Examiner*—Teresa J. Walberg
*Assistant Examiner*—Raphael Valencia
*Attorney, Agent, or Firm*—Donald C. Lepiane

[57] ABSTRACT

The wiper rest area of an automotive windshield is heated by a heatable member optionally mounted on a polyester substrate or heating element. The windshield includes outer and inner glass sheets secured together by an interlayer. The heating element is positioned on inner surface of the outer glass sheet and held in position by the interlayer securing the inner and outer sheets together. The heating element or heatable member has extensions extending beyond the edge of the windshield to provide external electrical access to the heatable member to power the heating element to heat the wiper rest area or position.

22 Claims, 5 Drawing Sheets

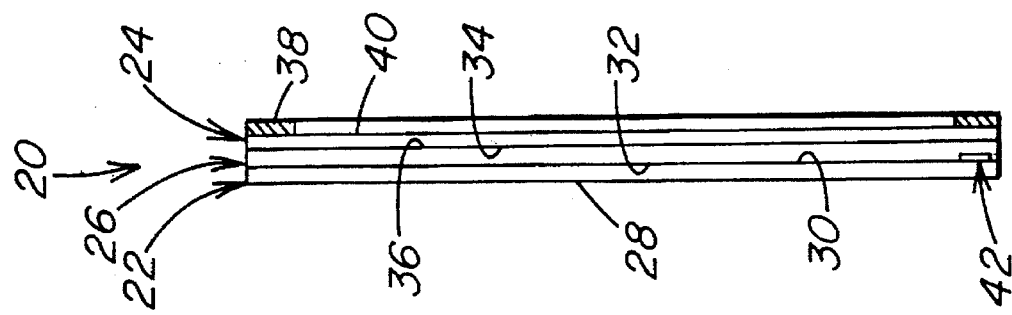
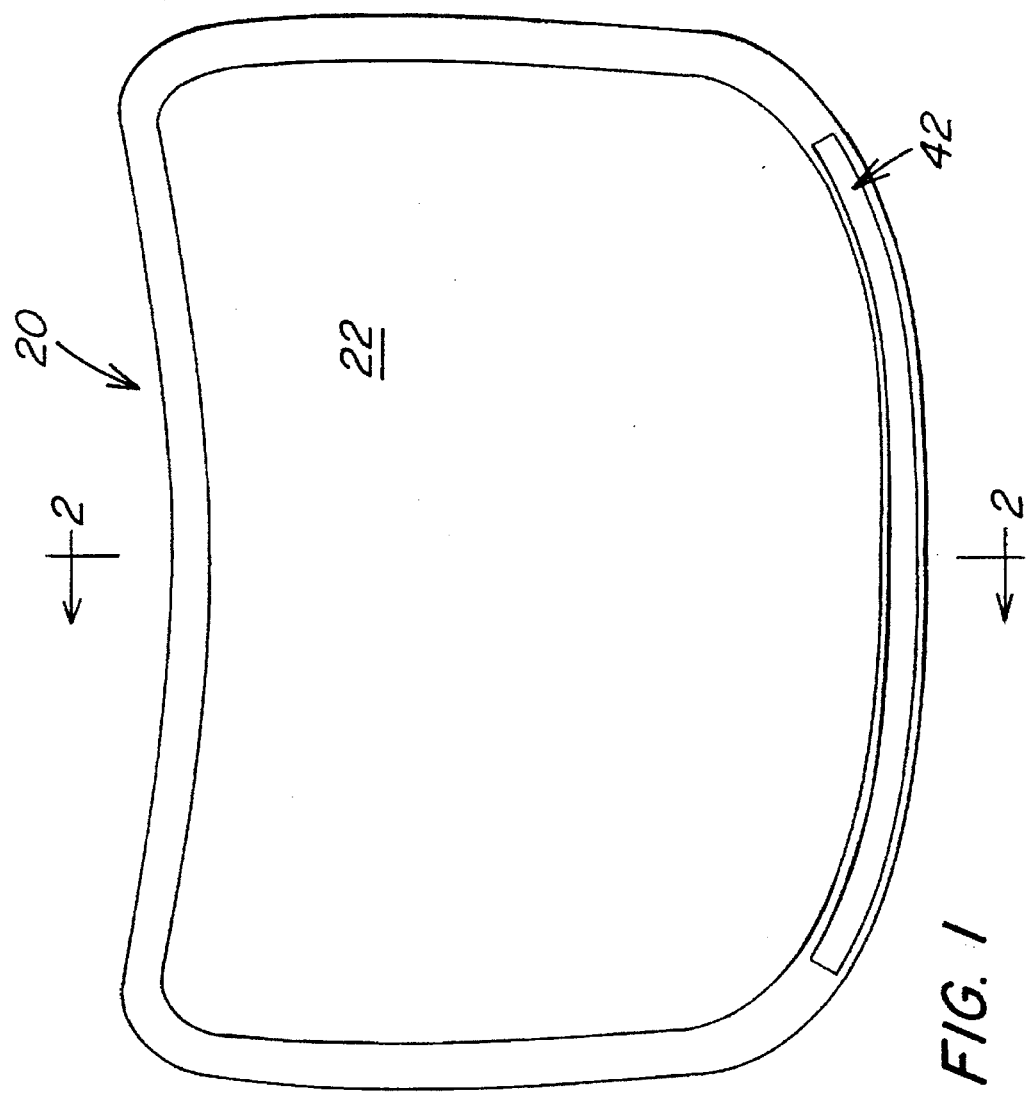

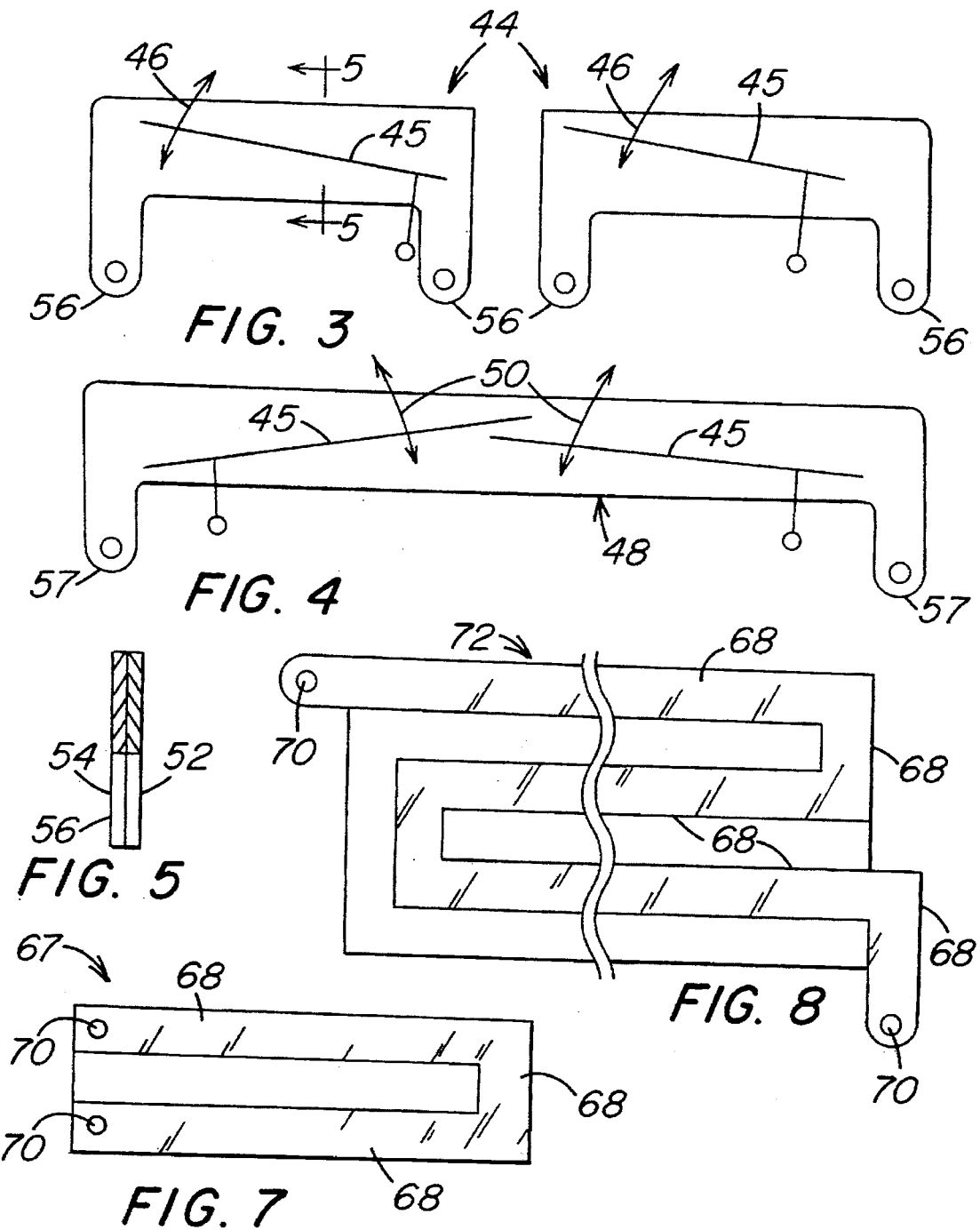

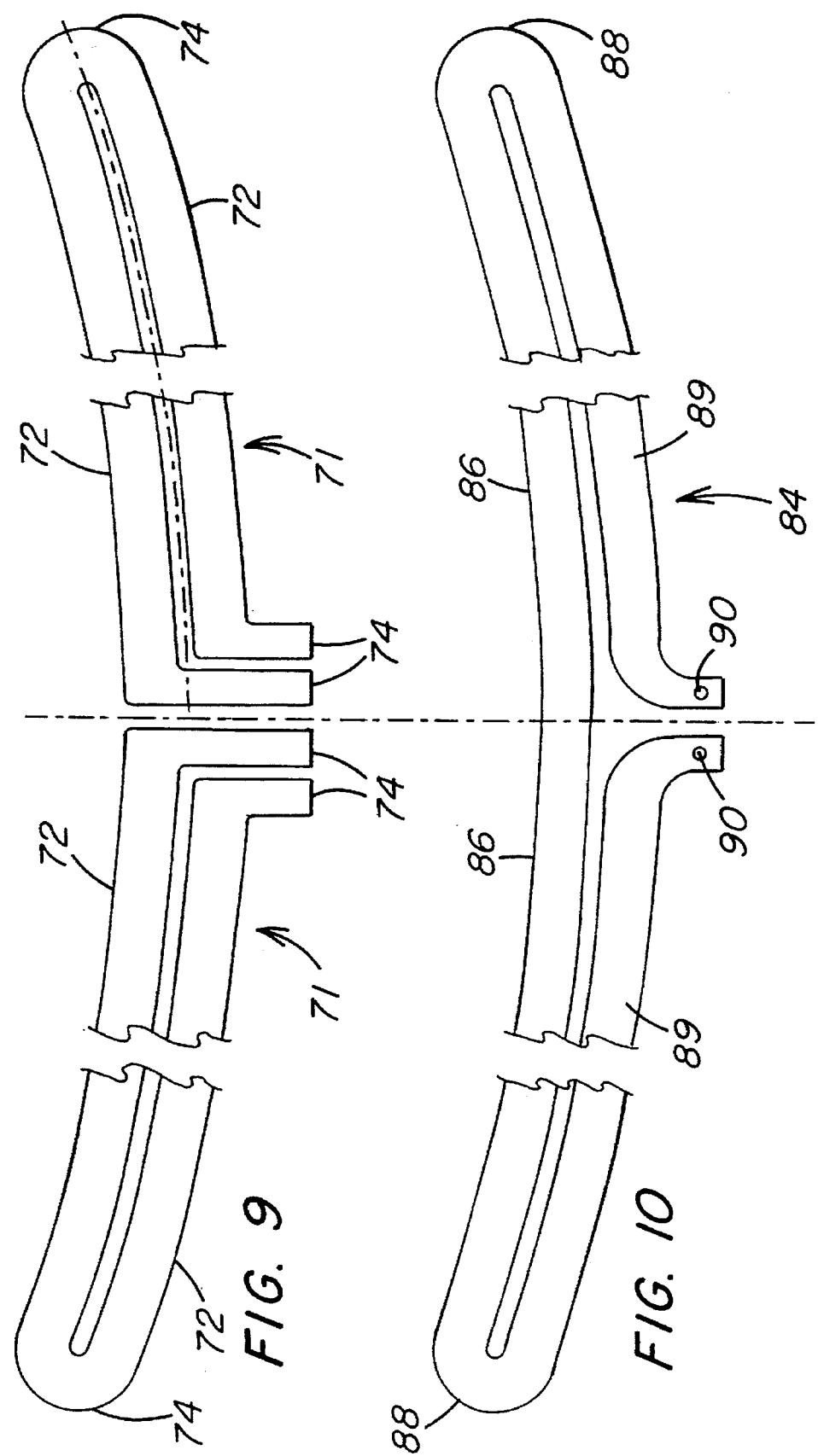

L-SHAPED HEATING ELEMENT WITH RADIUSED END FOR A WINDSHIELD

FIELD OF THE INVENTION

This invention relates to an element for heating wiper rest area of a transparency and method of fabricating a transparency having the element and, in particular, to a heating element having an electroconducting member, optionally on a non-electroconductive substrate, and method of using same in the manufacture of an automotive windshield to provide the windshield with a heatable wiper rest area.

BACKGROUND OF THE INVENTION

In general, wipers are used to remove excess water from transparencies such as automotive windshields and rear windows. It is known that extreme cold hardens the material of the wipers and/or freezes moisture resulting in the wiper sticking to the windshield and/or window. At the present time there are available automotive windshields and rear windows having facilities to heat the rest area or rest position of the wiper to soften the material of the wiper and/or to melt frozen moisture between the wiper and the windshield and/or rear window so that the wiper is free to move when the wiper motor is energized.

U.S. Pat. No. 4,109,133 teaches a rear window for an automobile having at an upper portion thereof resistance-heating wires for electrically heating the window. A window wiper is provided to sweep the window. In the wiper rest area or position, the window is provided with a heating wire to heat the rest area to free the wiper when frozen to the window. The width of the heated area in contact with the wiper is increased by providing the heating wire with sinusoidal undulations. U.S. Pat. No. 4,513,196 teaches a heatable windshield having two zones each having a plurality of spaced wires; one zone for rapid heating, the other for slow heating. The wires of each zone are sized to provide each zone with the different heating rate.

U.S. Pat. No. 4,971,848 discloses a heatable windshield having a plurality of fine conductive wires in the vision area and an increase in the number of wires in the lower portion to heat the wiper rest area or wiper rest position. The conductive wires are provided by depositing an electrically conductive enamel on the glass and heating the enamel to melt the enamel to the glass. Patentschrift 150 979 discloses a rear window heating system that also includes a plurality of spaced conductors in the vision area of the window and reduction in the space between the conductor in the end-of-travel position of the wiper blade. The spaced conductors are applied by screen printing a conductive heat setting material and thereafter firing the material to set it to the glass.

U.S. Pat. No. 4,373,130 also discloses a windshield having a heatable wiper rest area. The heatable area includes an electric heating resistance member between the inner and outer glass panes of the windshield or on outer surface of the inner pane of a laminated windshield. An opaque layer is disposed either on the inner or outer surface of the outer pane. When the resistance member is mounted on the outer surface it is positioned between an opaque member that is heat conductive and a member close to the outer surface of the pane that is less heat conductive than the opaque member. The heating member may be a plurality of conductors or a continuous metal or semiconductor layer.

European Patent Application 0 625 422 A1 discloses a heatable windshield having a plurality of closely spaced conductive strips on an enamel layer on the inside surface of the outer pane to heat the windshield wiper area. The strips are applied by screen printing silver on the decorative edge and thereafter heating the silver to set the strips. U.S. patent application Ser. No. 07/733,785 filed in the name of Harry S. Koontz on Jul. 22, 1991, for Coated Windshield With Special Heating Circuit For Wiper Arm Storage Area discloses a heatable windshield having a heatable member e.g. an electroconductive coating and bus bars spaced from one another at the lower portion of the windshield to heat the wiper rest area.

U.S. Pat. No. 4,910,380 discloses a motor vehicle window having a glass pane having an outer edge and a peripheral black obscuration band extending around the pane edge. The band is formed of a coating-deposited black conductor capable of generating heat when an electric current is passed through it. The black conductor made of frit that is silk screened onto the glass and fired to set the conductor to the glass may be mounted on a black non-conductive member or within a spaced non-conductive member. The black conductive member may be used to heat the wiper rest position on the window.

The above patents/patent application discuss techniques for heating windshield and/or rear window wiper rest areas. The techniques disclosed therein have drawbacks and/or limitations. More particularly, when the heating element or member is applied to the glass or a component of a laminated windshield, any defects in the heating element require the glass or component to be scraped or reworked; both options are expensive.

As can be appreciated it would be advantageous to provide a heating system e.g. a system for heating wiper rest area or wiper rest position of an automotive transparency, and method for making and using same that does not have the drawbacks or limitations of the presently available systems and methods.

SUMMARY OF THE INVENTION

This invention relates to a transparency having a heatable position e.g. an automotive backlite and/or an automotive windshield. The automotive windshield may be of the type automotive windshield having heatable wiper rest position, at least one rigid sheet having a major surface e.g. a glass sheet and a sheet member e.g. a plastic interlayer secured to the major surface of the at least one rigid sheet. An electrical heatable member is between the at least one rigid sheet and the sheet member in a predetermined location to heat the heatable position. The heatable member is preferably positioned on the major surface of the at least one rigid sheet after the rigid sheet is processed and prior to overlaying the sheet member on the surface of the rigid sheet. The electrically heatable member or heating element includes an electrically conducting member which may be optionally mounted on a non-electrically conducting substrate. In the instance where the conducting member can withstand handling e.g. when the conducting member is a wire cloth or heavy foil, the non-electrically conductive substrate is not usually used; when the conductive member is fragile e.g. a coating film, the non-electrically conductive substrate is usually used i.e. the coating is deposited on a non-electrically conductive substrate. During fabrication of the windshield, the heating element is preferably positioned on the inner surface of the outer glass sheet of the windshield to be manufactured, the interlayer is positioned over the inner surface of the outer sheet and the heating element and thereafter the inner glass sheet is positioned over the interlayer. The assembly is laminated to provide a laminated windshield having a heatable wiper rest area. The heating element is held in position by the adhesion of the interlayer to the inner surface of the outer sheet.

This invention also relates to a process of manufacturing the transparency having a heatable position a windshield having a heatable wiper rest position. The method includes positioning a heatable member or heating element on the major surface of a rigid substrate e.g. on inner surface of a glass sheet of the windshield being formed. Overlying a sheet member e.g. the interlayer on the major surface and the heating element. The rigid sheet and sheet member, e.g. the glass sheet, interlayer and optionally a second glass over the interlayer are laminated together to secure the heating member in a predetermined position to heat the heatable position.

BRIEF DESCRIPTION OF THE DRAWING

FIG. 1 is a plan view of a windshield having a heating element of the instant invention to provide the windshield with a heatable wiper rest area.

FIG. 2 is a view taken along lines 2—2 of FIG. 1.

FIG. 3 is a plan view of two heating elements incorporating features of the invention for use with windshield wipers that do not overlap in the rest position.

FIG. 4 is a plan view of a heating element of the instant invention that may be used with wipers that overlap in the rest position.

FIG. 5 is a view along line 5—5 of FIG. 3.

FIGS. 7–11 are plan view of different embodiments of heating elements of the instant invention.

DESCRIPTION OF THE INVENTION

Figure 6:
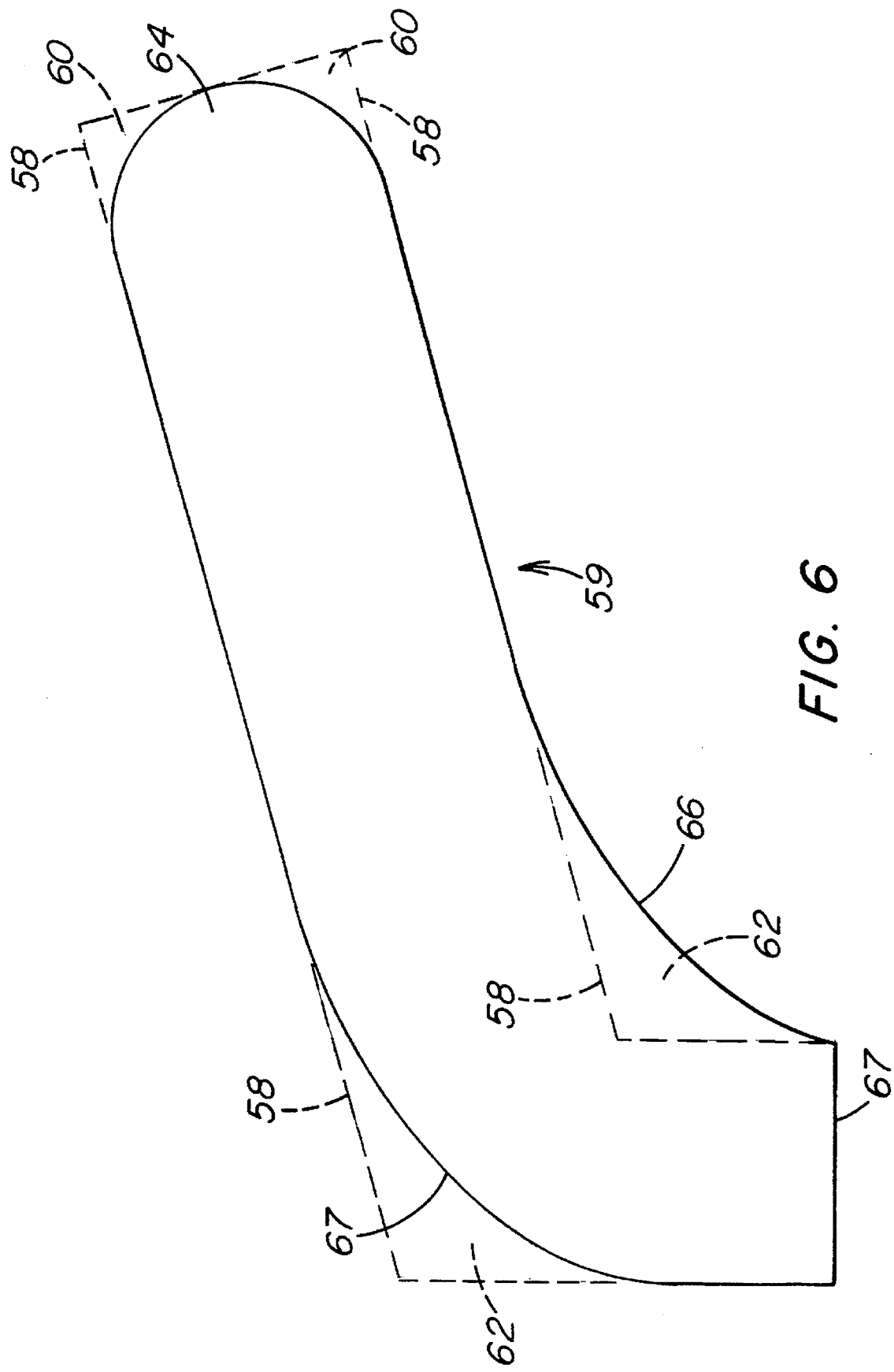
FIG. 6 is a plan view of a heating element of the instant invention having radiused portions instead of square portions shown in phantom to element hot and cold spots.

The instant invention will be discussed for use with an automotive windshield; however, as will be appreciated, the invention is not limited thereto and may be used with any window or transparency for any type of air, space, water and/or land vehicle and/or windows for any type of building. Further, in the following discussion of the invention, the automotive windshield has a laminated structure including two pieces of glass joined together by an interlayer material. As will be appreciated, the invention is not limited thereto and may be used on automotive windshields of the type having a single piece of glass and a plastic layer on a surface of the glass, e.g. of the type disclosed in U.S. Pat. No. 4,643,944 which teachings are hereby incorporated by reference. Further, the invention may be used with transparencies made of any material e.g. but not limiting to the invention, glass, glass-ceramic and/or plastic.

In the following discussion, like numerals refer to like elements unless otherwise indicated. With reference to FIGS. 1 and 2, and more particularly to FIG. 2 there is shown a windshield 20 incorporating features of the invention. The windshield 20 includes an outer glass sheet 22 and an inner glass sheet 24 joined by an interlayer 26 e.g. a sheet of polyvinylbutyral. The outer glass sheet 22 has an outside surface 28 over which wipers are moved in any convenient manner to remove excess moisture, e.g. water, snow, dew and/or ice. the outer glass sheet 22 has an inner surface 30 secured to surface 32 of the interlayer 26 with inner surface 34 of the inner glass sheet 24 secured to surface 36 of the interlayer 26. The surfaces 30 and 34 of the outer sheet 22 and inner sheet 24, respectively, are joined to the surfaces 32 and 36 of the interlayer 26, respectively, in any convenient manner, e.g. but not limiting to the invention in the manners disclosed in U.S. Pat. Nos. 4,368,087 and 4,988,398 which teachings are hereby incorporated by reference.

As can be appreciated by those skilled in the art the invention may be practiced with glass of any composition. For example, but not limiting to the invention, glasses having the compositions disclosed in U.S. Pat. Nos. 4,792,536; 5,071,796 and 5,240,886 and European Patent Application 0 598 305 A1 which disclosures are hereby incorporated by reference may be used in the practice of the invention. Further, the glass sheets 22 and 24 and/or interlayer 26 may have a coating an environmental coating of the types disclosed in U.S. Pat. Nos. 5,028,759 and 5,059,295 or an environmental, heatable coating e.g. of the types disclosed in U.S. Pat. Nos. 4,898,789 and 5,208,444. The disclosures of U.S. Pat. Nos. 4,898,789; 5,028,759; 5,059,295 and 5,208,444 are hereby incorporated by reference.

The interlayer 26 may be any of the types known in the art of laminating glass sheets e.g. the interlayer 26 may have a uniform thickness throughout its extent or may have a taper from top to bottom edges or bottom to top edges as disclosed in Italian Patent No. 1,244,185. Further the windshield may include a shade band, e.g. as disclosed in U.S. Pat. No. 4,554,713. The disclosures of U.S. Pat. No. 4,554,713 and Italian Patent No. 1,244,185 are hereby incorporated by reference.

An opaque decorative band 38 of the type used in the art is provided on marginal edge portions of outer surface 40 of the inner sheet 24. For purpose of clarity, the outer surface 40 of the inner sheet 24 faces the interior of the automobile. Although not limiting to the invention, the opaque band 38 is a black ceramic paste silk screened onto the marginal edges of the inner surface 40 of the inner sheet 24 and fired into the glass during the thermal shaping of the glass sheets. The band 38 hides adhesive used to secure the windshield onto the automobile body opening while preventing degradation of the adhesive by solar energy. The material of, method of applying, and configuration of, the band 38 which is not limiting to the invention may extend from about one inch (2.54 centimeters; centimeters hereinafter "cm") to about 7 inches (17.78 cm) from the edge of the inner sheet 24. Heating element 42 incorporating features of the invention, in the embodiment shown in FIG. 2, is against the inner surface 30 of the outer sheet 22 facing the wiper rest area or position. The heating element 42 is biased against the inner surface 30 of the outer sheet 22 and secured in position by the interlayer material 26 which overlays the heating element and is adhered to the inner surface 30 of the outer sheet 22.

Referring now to FIG. 3, there is shown heating elements 44 in a position recommended for use with windshield wipers 45 that travel in tandem in the direction of the path designated by lines 46, and with the rest position of the wipers in different locations e.g. one wiper to the left as shown in FIG. 3 of the windshield (not shown in FIG. 3) and the other in the center of the windshield. As will be appreciated, the invention is not limited to the number of windshield wipers, the length or direction of wiper movement or the length of the wiper rest area. For example, and with reference to FIG. 4 in the instance when the wipers 45 in the rest position overlap in center portion of the bottom edge of the windshield (not shown in FIG. 4) one heating element 48 incorporating features of the invention may be used. The wiper movement path in FIG. 4 is designated by numeral 50.

As can be appreciated, under certain conditions, when the wiper motor is deenergized, the wipers stop in the vision line of the driver. In the discussion of the invention, such a position is not the rest position. Further as will be appreciated the specific area of the wiper rest position is not limiting to the invention e.g. the wiper rest area may be at the top of the windshield as mounted in the automobile.

The heating element of the instant invention includes an electrical heatable member optionally on a substrate. As will be appreciated but not limiting to the invention in those instances when the electrical heatable member is fragile and is easily torn or crumbled e.g. a coating film or a very thin conductive foil, the use of a substrate is recommended; in those instances when the electrical heatable member has structural stability, the use of a substrate is not necessary. The above discussion is further developed below.

The discussion will now be directed to the preferred electrical heating properties of the electrical heatable or conducting member of the instant invention. The heatable member preferably provides a power density of about 0.5 watts/sq. inch. Lower densities may be used; however, at lower power densities a longer time period is required to melt ice or free the wiper frozen to the windshield. At higher power densities, the time period decreases; however, excessive heat may cause delamination of the laminated windshield or edge stresses in the glass sheets. In the practice of the invention, a power density range of about 0.05 to 2.0 watts/sq. inch is useable, 0.2 to 1.0 watts/sq. inch is acceptable and 0.4–0.6 watts/sq. inch is preferred.

In the practice of the invention, the selection of the electrical heatable member may be determined using the following equations which determination is not limiting to the invention:

$$S=P/A \qquad \text{Equation (1)}$$

where:
S is power density of the heatable member in watts/sq. inch;
P is power of the heatable member in watts, and
A is area member of the heatable member in sq. inches.

$$P=VI \qquad \text{Equation (2)}$$

where:
P is as previously defined;
V is the voltage of the power supply which is a 12 volt car battery, and
I is the current flow through the heatable member in amperes.

$$V=IR \qquad \text{Equation (3)}$$

where:
V and I are as previously defined, and
R is the resistance of the heatable member in ohms.

Equations (1), (2) and (3) are combined to provide following equation (4).

$$S(=P/A=VI/A)=V^2/AR \qquad \text{Equation (4)}$$

where
S, P, A, V, I and R are as previously defined.

Solving Equation (4) for R, equation (4) became following equation (5).

$$R=V^2/AS \qquad \text{Equation (5)}$$

where
R, V, A and S are as previously defined.

Substituting known values in Equation (5) which are: V is 12 volts; S is 0.5 watts/sq. inch and the area for heatable member which is the area of the wiper rest position to be heated. The area of each of the heatable members 44 in FIG. 3 is considered for this discussion 31 inches (78.74 cm) (the length) times 3 inches (7.62 cm) (the width) which equals about 93 sq. inches (600 sq. cm) (the area). Using the above given values for V, A and S, the resistance (R) of the heatable member is about 3.1 ohms.

The resistance of the material of the heatable member is equal to the surface resistivity of the material times the length between the electrical connections divided by the cross section area of the material. See following equation 6.

$$R=K(l/(T \times W)) \qquad \text{Equation (6)}$$

where:
R is the resistance of the material.
K is the resistivity of the material in ohms inch;
l is the length of the material in inches;
T is the thickness of the material in inches; and
W is the width of the material in inches.

Using the above discussed value for R, l and W which are the resistance (R) is 3.1 ohms; the length (l) is 31 inches (78.74 cm), the width (W) is 3 inches (7.62 cm), the thickness and the resistivity (K) of the material are the variable parameters. The next step is to select an electrical conducting material. In the practice of the invention but not limiting thereto, stainless steel and aluminum are preferred because they are inexpensive and good electrical conductors. The remaining unknown is thickness of the electrical heatable member. Tables of conductivity for various materials are readily available e.g. in the Ninth Edition of Mark's Standard Handbook for Mechanical Engineers published by McGraw-Hill Book Company.

Equations (1), (2), (3), (4), (5) and (6) are equations known to those skilled in the art of electric circuits.

The discussion will now be directed to various embodiments of the invention. With reference to FIGS. 3 and 5, the heating element 44 includes a non-electric conductive carrier or substrate (hereinafter "NEC substrate") 52 having an electrical heatable or conducting member 54 to heat the wiper rest area.

The material of the heatable member 54 is not limiting to the invention and may be made of any electrical conductive material e.g. aluminum, gold, silver, nickel, zinc, platinum, tungsten, stainless steel and alloys thereof to name a few. In addition, the electrical conducting member 54 may be a non-conductive film e.g. an organic adhesive having conductive particles e.g. but not limiting to the invention particles of aluminum, gold, silver, nickel, zinc, platinum, tungsten, stainless steel and alloys thereof to name a few dispersed therein. The conducting member 54 may be applied to the NEC substrate 52 in any manner, e.g. sputter coating, spraying, electron deposition, electroless deposition, dip coating, painting to name a few.

The NEC substrate 52 is any material that does not conduct current. For example, but not limiting to the invention, the NEC substrate may be made of mica, plastic or pressed reinforced fiber glass board. Plastics that may be used in the practice of the invention but not limited thereto include polyesters such as polyethylene terephthalate or polybutylene terephthalate. In the practice of the invention it is recommended that the NEC substrate be flexible and thin because it is preferably laminated between bent glass sheets. As can be appreciated, if the heating element 44 is applied to the outer surface 40 of the inner glass sheet 24 or outer surface 28 of the outer glass sheet 22 (see FIG. 2), the thickness of the heating element 44 and in particular of the NEC substrate becomes less of a concern. Further as can be appreciated, when the glass sheets are flat or have a minor contour, the heating element 44 need not be as flexible as when the glass sheets have more than a minor contour. In the practice of the invention the NEC Substrate was a polyester sheet having a thickness of 0.002 inch (0.005 cm) of the type sold by Excello Specialty Company having an aluminum sputter coating thereon.

In the instance where the heating element e.g. the heating element 48 shown in FIG. 4 is made of a structurally stable material, the NEC substrate is not necessary. For example, and not limiting to the invention, electrical conducting foils or cloths, e.g. foils or wires of stainless steel, aluminum, silver, zinc, platinum, gold, tungsten and alloys thereof to name a few may be used. Foils and wire cloths and in particular wire cloths are preferred in the practice of the invention because they easily conform to the contour of the glass sheets, provide a rough surface for the interlayer 26 to engage when the glass sheets and interlayer are laminated together and are structurally stable. In the practice of the invention a 325 wire cloth made of stainless steel wires each having a diameter of about 0.0014 (0.004 cm) was used.

In the practice of the invention it is preferred that the heating elements 44 and 48 be mounted on the inner surface 30 of the outer glass sheet 22 as shown in FIG. 2. Further when the heatable member has a shiny surface i.e. a reflective surface and is mounted on an NEC substrate having a dull surface i.e. a non-reflective surface, it is recommended that the NEC member be positioned next to the inner surface 30 of the outer glass sheet 22 (see FIG. 2). The non-reflective surface of the NEC substrate may have a colored surface such as a color to match the black band usually present on automotive windshields or match the color of the car body. In the instance when the heatable member is next to the inner surface of the outer glass sheet, the surface of the heating member should have a non-reflective surface e.g. dull color obtained by coating the heatable member with a non-reflecting paint.

With reference to FIGS. 3 and 4, the heating elements 44 and 48 have a pair of extensions 56 and 57 to provide external electrical access to the heating elements 44 and 48, respectively. As can be appreciated, the location of the extensions is not limiting to the invention and are used to provide external electrical access to the heating element.

In the practice of the invention it was determined that heating elements with sharp corners or small radiuses create hot and cold spots and that these are eliminated by providing the corners with large radiused contours. With reference to FIG. 6, there is shown heating element 59. Dotted lines 58 show the portion of the corners that were eliminated. Cold spots occur at the removed corner portions designated by the numerals 60, and hot spots occur at the corner designated by the numerals 62. The cold spots were eliminated by providing a radiused end 64 of about 1⅜ inch (3.5 cm), hot spots were eliminated by providing a 1⅜ inch (3.5 cm) radius at locations identified by numerals 66 and 67. External access to the heating element is provided at radiused end 64 and end 67. The portion of the heating element 59 between the radiuses 66, 67 and the end 64 is contoured to follow the contour of the bottom of the windshield and is usually uniformly spaced from the bottom of the windshield a distance of about 1 inch (254 cm).

The shape of the radius to eliminate the hot and/or cold spots may be determined by passing a current through the heatable member and observing it with an infrared scope as it heats up. The hot and cold spots can be observed and the corners shaped as required to eliminate or reduce the hot and cold spots. Radiuses in the range of about ¼ inch (0.88 cm) to about 5 inches (12.70 cm) are believed usable, about ½ inch (1.27 cm) to about 4 inches (10.16 cm) are preferred, and 1.25 inch (4.32 cm) to 3.5 inch (12.16 cm) more preferred, to minimize if not eliminate hot and cold spots.

With the above background, the discussion will now be directed to various configurations of the heating element of the instant invention. As can be appreciated some of the heating elements shown in the figures are shown without radiused corners for ease of drafting, however as previously discussed radiused corners are preferred.

Shown in FIG. 7 is heating element 67 having a generally "C" shaped configuration. Each strip 68 of the heatable member has a width of about 1.25 inch (3.18 cm), a length of about 31 inches (78.75 cm), and a spacing between horizontal strips 68 as shown in FIG. 7 of about 0.25 inch (0.63 cm). The holes 70 provide external electrical access to the heating element.

Shown in FIG. 8 is heatable member 72. The strips 68 of the heatable member are interconnected to provide an "s" shaped configuration. As shown in FIG. 8, the horizontal strips have a length of about 31 inches (78.75 cm); the horizontal strips and vertical strips as shown in FIG. 8 have a width of about 1.25 inch (3.18 cm), and the horizontal strips are spaced about 0.25 inch (0.63 cm) from one another.

Shown in FIG. 9 are a pair of heating members 71. Each of the heating members has a pair of spaced strips 72 joined at end 74 and have spaced extensions 74 to provide electrical external access to the heating member.

In the practice of the invention, the heatable member shown in FIG. 9 was made of an aluminum sputtered film having a thickness of about 0.3 microns deposited on a polyester substrate having a thickness of about 0.002 inch (0.005 cm) of the type sold by Excello Specialty Company. The length was about 31 inches (78.75 cm) and the width of each strip about 1.25 inches (3.18 cm). The heating element prior to connecting to a 12 volt had a resistance of about 8 ohms. After powering, the heating element failed to generate heat. It is believed the coating could not carry the electrical load and failed.

The heating element or heatable member 84 shown in FIG. 10 includes an upper strip 86 connected at each end 88 to lower strip 89 with the lower strips connected to extensions 90 as shown in FIG. 10 to provide electrical access. The corners were eliminated by providing ends 88 with a radius of about 0.5 inch (1.76 cm). The heatable member was made of a stainless steel 325 mesh cloth having about 0.0014 inch (0.0036 cm) diameter stainless steel wires. The heating element was laminated between a pair of glass sheets against the inner surface 30 of the outer sheet 22 as shown in FIG. 2. The windshield had a height of about 39.5 inches (1.1 meter), a curved top and bottom edges and a width of about 80 inches (20 meters). The length of the strip 86 between ends 88 was about 39.5 inches (100.3 cm) and the width of strips 86 and 89 was about 1.25 inch (3.18 cm). The overall width of the heating element 74 was about 2.75 inch (7 cm). The resistivity at 0° F. was about 4.33 ohms which produces a watt density of 0.287 watts/sq. in. The heating element took about 7½ minutes to melt frost in the wiper rest area. The frost melted was generated at an ambient temperature of −14.8° F to −9.4° F. by 0.01 ounces of water per square inch of total surface area of windshield.

Referring back to FIG. 6, another embodiment of the invention is discussed. In the preferred practice of the invention, the heating element 59 or heatable member 59 shown in FIG. 6 was made of stainless steel cloth having 325 mesh and wires having a diameter of 0.0014 inch (0.0036 cm). The heatable member 59 between the radius designated by the numeral 66 and the end 64 had a length of about 31 inches (100.3 cm) and a width of about 2 inches (5.08 cm). The ends 64 and 67 each had a radius of about 0.5 inch (1.27 cm) with the width of the end 64 expanding for a distance of about 3 inches (7.62 cm) to the width of about 2 inches (5.08 cm). The radius designated by the numeral 66 was about 1.75 inch (4.45 cm) and the radius designated by the numeral 67 was about 3.75 inch (9.53 cm). The end 67 having the radius of about 0.5 inch (1.27 cm) had a length of about 3 inches (7.62 cm) to the radius designated by the numeral 66 during which is expanded in width to a width of about 2 inches (5.08 cm) at the end of the radius designated by the numeral 66. The portion of the heating element 59 between the radius designated by the numeral 66 and the end 64 had a contour matching the contour at the bottom of the windshield. The bottom edge of the heating element 59 as viewed in FIG. 6 was spaced about 1 inch (2.54 cm) from the bottom edge of the windshield. The resistivity was 0.987 ohms with a power density of 1.6 watts/sq. inch. The heatable member 59 took 1.5 minutes to melt frost in the wiper rest area. The frost was generated as discussed above.

A heating element 59 having the physical dimension discussed above was made having a sputtered aluminum coating having a thickness of about 0.3 micron deposited on a polyester substrate having a thickness of about 0.002 inch (0.005 cm) of the type sold by Excello Specialty Company. The heating element had a measured resistance of 8.5 ohms. The heating element was not powered.

Figure 11:
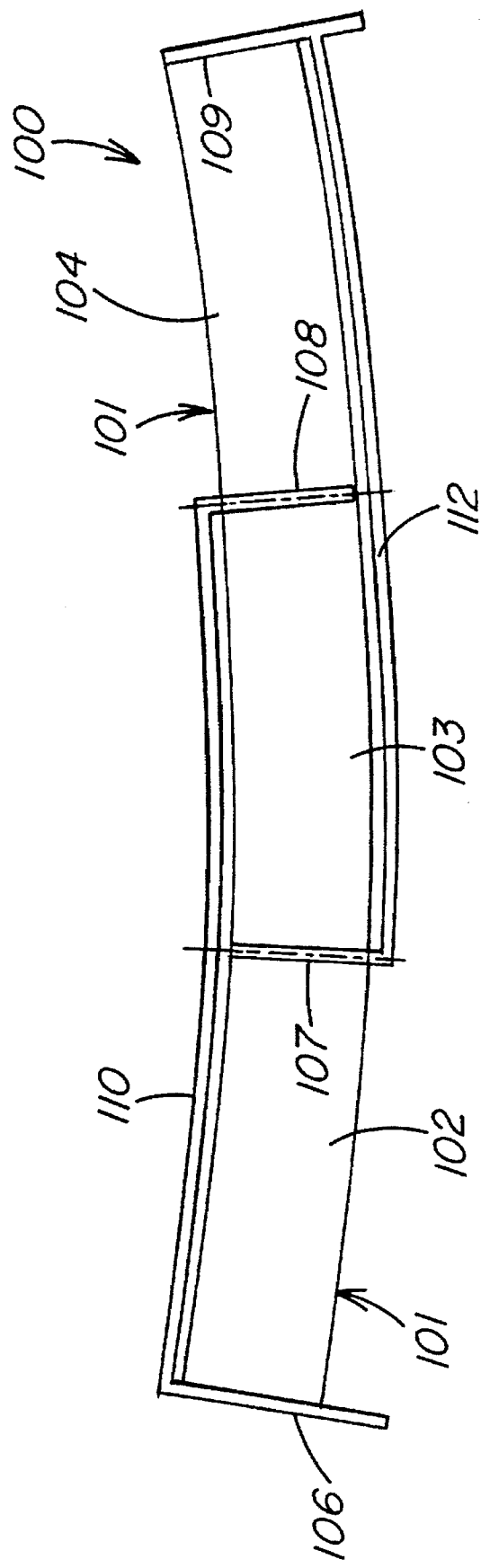

Shown in FIG. 11 is another embodiment of a heating element of the instant invention. Heating element 100 shown in FIG. 11 includes a conductive coating 101 on an NEC substrate; the coating is divided into discrete areas 102–104 by bus bars 106–109. The bus bars 106 and 108 are connected by bus bar 110 and connected to output of the power source e.g. the negative output of the car battery, and the bus bars 107 and 109 are connected bus bar 112 and connected to the other output of the power source e.g. the positive output of the car battery. Electrically separating the coating into discrete areas increases the resistance. As can be appreciated, the invention is not limited to the number of discrete areas. Further in the instance when the windshield is a heatable windshield of the type known in the art having a conductive coating on a glass sheet, the coating 101 and the discrete areas 102–104 may be isolated portions of the deposited conductive coating.

The heating element 100 shown in FIG. 11 was made of a conductive coating deposited on the lower inner surface 30 of the outer sheet 32 shown in FIG. 2. The coating disclosed in U.S. Pat. No. 4,898,789 included starting at the glass surface about a 300 Angstrom film of zinc stannate/about a 100 Angstrom film of silver/about a 15 Angstrom film of titanium/about a 600 Angstrom film of zinc stannate/about a 100 Angstrom film of silver/about a 15 Angstrom film of titanium/about a 300 Angstrom film of zinc stannate/about a 20 Angstrom film of titanium. The coating 104 had a width of 3 inches (7.62 cm) and a length of 30 inches (76.20 cm). The bus bars and extension had a width of ¼ inch (0.63 cm). The total ohms of the discrete areas 101–104 was measured and had a resistivity of 3.4–3.5 ohms. Based on 3.4 ohms the heating element 100 has a power density of 0.42 watts/sq. inch.

As can now be appreciated, in the discussion the heating member includes the heatable member on an NEC Substrate or the heatable member without an NEC Substrate.

In the practice of the invention two sheets of glass to be used in the fabrication of an automotive windshield were shaped in a convenient manner. The heating element or heatable member 84 stainless steel wire cloth discussed above and having the design shown in FIG. 10 was positioned on the inner surface 30 of the outer sheet 22 in the expected wiper rest area as shown in FIG. 2. The extensions 90 extended beyond the edges of the sheets to provide external electrical access to the heatable member 84. The interlayer 26 was positioned over the inner surface 30 of the outer sheet 22 and the heatable member, after which the second sheet 24 was positioned over the interlayer 26. The assembly was laminated in any convenient manner to provide a windshield having a heatable wiper rest area.

The heating element or heatable member of the instant invention is applied by laying it on the inner or outer surface of the outer sheet, and/or inner or outer surface of the inner sheet in the expected area of the wiper rest area. In the practice of the invention the heating element when positioned on the sheet is considered "detachably secured" to the components of the windshield because it is a discrete part that is assembled with the other component prior to laminating. Therefore, as used herein and in the claims the term "detachably secured" excludes ceramic frit or enamels fired to bond to the glass but does include adhesives to secure the heating element in position during assembly of the components of the windshield and laying the heating element on the glass sheets and/or interlayer. In the instance when the heating element or heatable member is positioned on the inner surface of the inner and/or outer sheets, it is secured in place by laminating the glass sheets together.

As can be appreciated, the instant invention provides an economical manner to fabricate windshields having a heatable wiper area. Because the heating element and heatable member of the instant invention is a discrete member and not silk screened onto the glass sheet, any design and/or color may be selected, the heating element and/or heatable member may be tested before use thereby reducing rejection before the windshield is fabricated.

As can now be appreciated, the invention is not limited to the above embodiments which are present for illustration purposes only and variations may be made without deviating from the scope of the invention,

What is claimed is:

1. A transparency comprising:

a first glass sheet having a first major surface and an opposite major surface defined as a second major surface, the first major surface having a surface area;

a second glass sheet having a first major surface and an opposite major surface defined as a second major surface;

an electrically heatable member having a major surface, the major surface of the heatable member having a surface area less than the surface area of the first major surface of the first glass sheet, the electrically heatable member comprising an electrically conductive elongated substrate having a first elongated leg connected to and offset from a second elongated leg with the first leg longer than the second leg to provide the substrate with a generally L-shape configuration, the end of the first leg having a radiused end and the juncture of the first leg and the second leg being radiused to provide uniform heating at the juncture, and a plastic interlayer securing the first major surface of the first glass sheet to the first major surface of the second glass sheet, and urging the electrically heatable member against selected portion of the first glass sheet to heat the selected portion of the first glass sheet and to heat by conduction portion of the second major surface of the first glass sheet opposite the selected portion of the first glass sheet when the heatable member as electrically energized.

2. The transparency as set forth in claim 1 wherein the electrically conductive elongated substrate is an organic substrate having conductive material dispersed therein to make the organic substrate electrically conductive.

3. The transparency as set forth in claim 1 further including means to provide external electrical access to the electrically conductive elongated substrate.

4. The transparency as set forth in claim 1 wherein the electrically heatable member includes the electrically conductive elongated substrate mounted on a non-electrically conductive substrate defined as an NEC Substrate.

5. The transparency as set forth in claim 4 wherein the electrically conductive elongated substrate is an electrically conductive film and the electrically heatable member includes the film deposited on the NEC Substrate by a process consisting of spraying, coating, painting, dip coating or roller coating.

6. The transparency as set forth in claim 5 wherein the film is selected from the group consisting of aluminum, gold, silver, nickel, zinc, platinum, tungsten and alloys thereof.

7. The transparency as set forth in claim 6 further including means connected to the electrically conductive elongated substrate to provide external electrical access to the electrically conductive elongated substrate.

8. The transparency as set forth in claim 1 wherein the first elongated leg of the electrically conductive elongated substrate includes a first elongated member and a second elongated member joined together and forming the radiused end and adjacent to and spaced from one another, the second leg is connected to and offset from the first elongated member of the first elongated leg and further including a third leg connected to and offset from the second elongated member of the first elongated leg and adjacent to and spaced from the second leg with the juncture of the third leg and the second elongated member of the first elongated leg being radiused.

9. The transparency as set forth in claim 8 wherein the electrically conductive elongated substrate is a cloth.

10. The transparency as set forth in claim 9 wherein the cloth is a wire cloth.

11. The transparency as set forth in claim 10 wherein the radiused end eliminates hot spots.

12. The transparency as set forth in claim 11 wherein the wire cloth is made of wires selected from the group aluminum, gold, silver, nickel, zinc, platinum, tungsten and alloys thereof.

13. The transparency as set forth in claim 1 wherein the radius at the juncture eliminates cold spots.

14. The transparency as set forth in claim 13 wherein the electrically conductive elongated substrate is a first electrically conductive elongated substrate and further including:

a second electrically conductive elongated substrate having an elongated leg defined as a third elongated leg connected to and offset from another elongated leg defined as a fourth elongated leg with the third leg longer than the fourth leg to provide the second substrate with an L-shape configuration, the end of the third leg having a radiused end and the juncture of the third leg and four leg being radiused to provide uniform heating at the juncture of the third and fourth legs, and an electrically conductive elongated connecting leg connected to the first member at the radiused end, extending adjacent to and spaced from the first leg and the third leg and connected to the third leg at the radiused end of the third leg and arranged to having the first and fourth legs adjacent to and spaced from one another, the connecting leg and the first leg forming the radiused end of the first leg and the connecting leg, and the third leg forming the radiused end of the third leg.

15. The transparency as set forth in claim 14 wherein the first, second, third, fourth and connecting legs are made of a wire cloth and further including means to provide external electrical access to the electrically conductive substrate.

16. The transparency as set forth in claim 13 wherein the radius at the juncture eliminates hot spots.

17. The transparency as set forth in claim 16 wherein the electrically conductive elongated substrate is a wire cloth.

18. The transparency as set forth in claim 17 wherein the wire cloth is made of wires selected from the group of aluminum, gold, silver, nickel, zinc, platinum, tungsten and alloys thereof.

19. The transparency as set forth in claim 16 wherein the transparency is an automotive transparency and the portion of the second major surface opposite the selected portion is expected wiper rest area.

20. The transparency as set forth in claim 19 wherein the transparency is a windshield.

21. The transparency as set forth in claim 19 wherein the transparency is a backlite.

22. The transparency as set forth in claim 19 further including means to provide external electrical access to the electrically conductive elongated substrate.

* * * * *